Grafton F. Mangum INVENTOR.

BY Rob' Williams

ATTORNEY

Sept. 12, 1967 G. F. MANGUM 3,340,691
COMMAND CONTROLLABLE SELF-PRESSURIZING
LIQUID INJECTION SYSTEM
Filed Oct. 14, 1965 5 Sheets-Sheet 5

Grafton F. Mangum INVENTOR.

BY *Rolf Williams*

ATTORNEY

United States Patent Office 3,340,691
Patented Sept. 12, 1967

3,340,691
COMMAND CONTROLLABLE SELF-PRESSURIZ-
ING LIQUID INJECTION SYSTEM
Grafton F. Mangum, Huntsville, Ala., assignor to Thiokol
Chemical Corporation, Bristol, Pa., a corporation of
Delaware
Filed Oct. 14, 1965, Ser. No. 495,792
2 Claims. (Cl. 60—250)

ABSTRACT OF THE DISCLOSURE

A liquid injection system for use with a rocket motor having layers of solid propellant therein separated by an inhibitive barrier, including a pressure vessel having therein a floating piston for dividing the pressure vessel into two separate chambers, a liquid in one of said chambers and a solid propellant in said pressure vessel, the burning of which will create combustion gases which will enter the second chamber to exert force on the floating piston which will then act on the liquid to force the liquid into the rocket motor to decompose the inhibitive barrier to achieve impulse control of the rocket motor.

---

This invention relates to new and useful improvements in injection systems for rocket motors and more particularly to a self-pressurizing system that is initiated upon receipt of a suitable command signal.

The injection system embodying the instant invention was provided to achieve impulse control of a rocket motor by selectively controlling the decomposition of insulating barriers positioned in a rocket motor to separate zones of solid propellant.

Pressurized injection systems for injecting reactants into a combustion chamber have been previously employed, but the instant invention differs from such procedures in that the injection system is utilized to provide in the rocket motor a gaseous environment that is suitable to decompose a barrier that isolates separate zones of solid propellant and thus achieve impulse control of a rocket motor.

It was determined that a suitable medium for removing the barrier was inhibited red fuming nitric acid, and it was found that when the burning of the solid propellant had progressed to the barrier, the injection of this medium into the rocket motor would decompose and remove the barrier. However, if the injection of this medium was delayed or withheld, further burning of the solid propellant would not be initiated providing partial range capability of the rocket motor. If desired, command control of the injection of the medium could immediately start the decomposition of the barrier to allow burning to progress to the next adjacent zone of solid propellant or the injection of the liquid could be withheld, as previously stated, to provide complete control of the full range capability of the rocket motor.

It was further determined during experimental evaluation that the inhibited red fuming nitric acid by itself would not remove the barrier in the desired time, therefore, to achieve more rapid decomposition and removal of the barrier, it was found beneficial to heat the inhibited red fuming nitric acid to high reactive temperatures. To produce such high temperatures, it was found that the instant injection system, which employs a hot gas generator to mix the hot gases produced thereby with the inhibited red fuming nitric acid, would produce a highly reactive oxidative gaseous environment. Such an environment would, therefore, be conducive to rapid decomposition and removal of the barrier. The combination of high temperatures and oxidative environment results in environment highly conducive to barrier removal.

It is an object of this invention, therefore, to provide an injection system that will provide impulse control for a rocket motor.

It is another object of this invention to provide an injection system that will introduce into a rocket motor a highly reactive oxidative gaseous environment that will decompose a barrier positioned between zones of solid propellant to provide complete control of the full range capability of the rocket motor.

It is a further object of the invention to provide an injection system that will provide stop-start capability for a rocket motor.

Other objects, features and advantages of the instant invention will become apparent from a consideration of the following detailed description when considered in conjunction with the accompanying drawings, in which.

Figure 1:
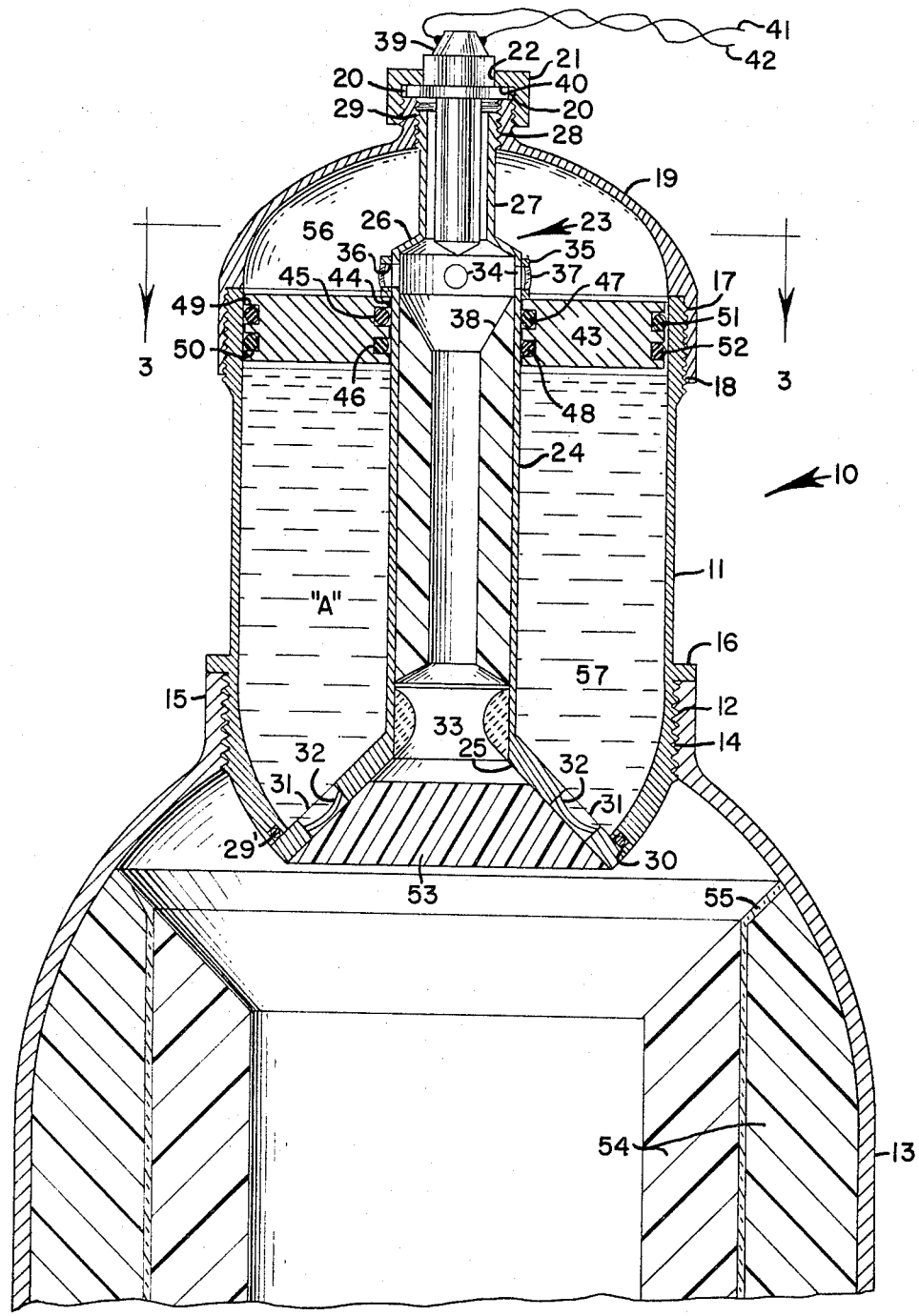
FIGURE 1 is a longitudinal sectional view, partly broken away, of one form of an injection system embodying the invention in normal pre-operating condition.
Figure 2:
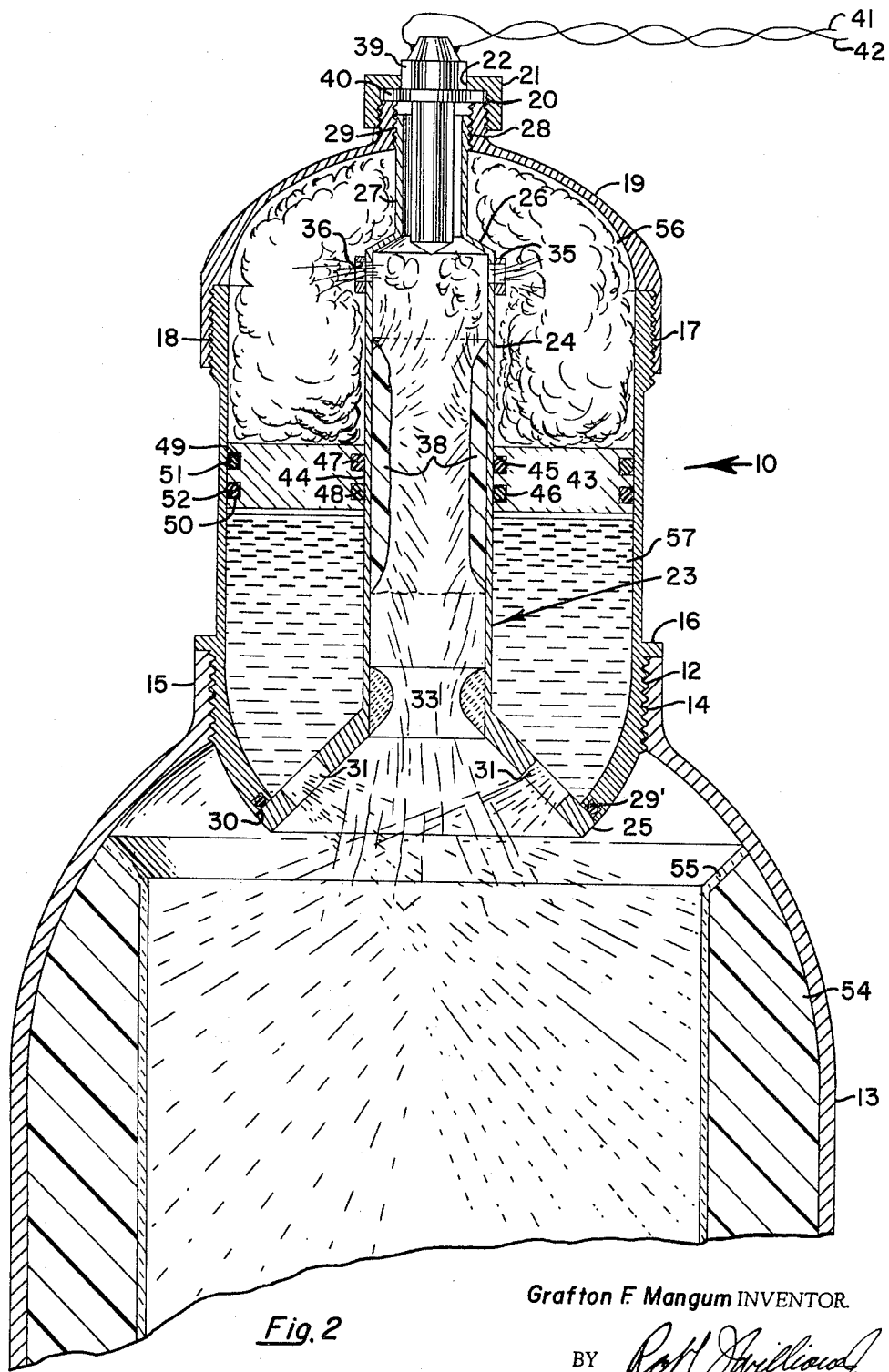
FIGURE 2 is a view similar to FIGURE 1, showing the injection system in operation.
Figure 3:
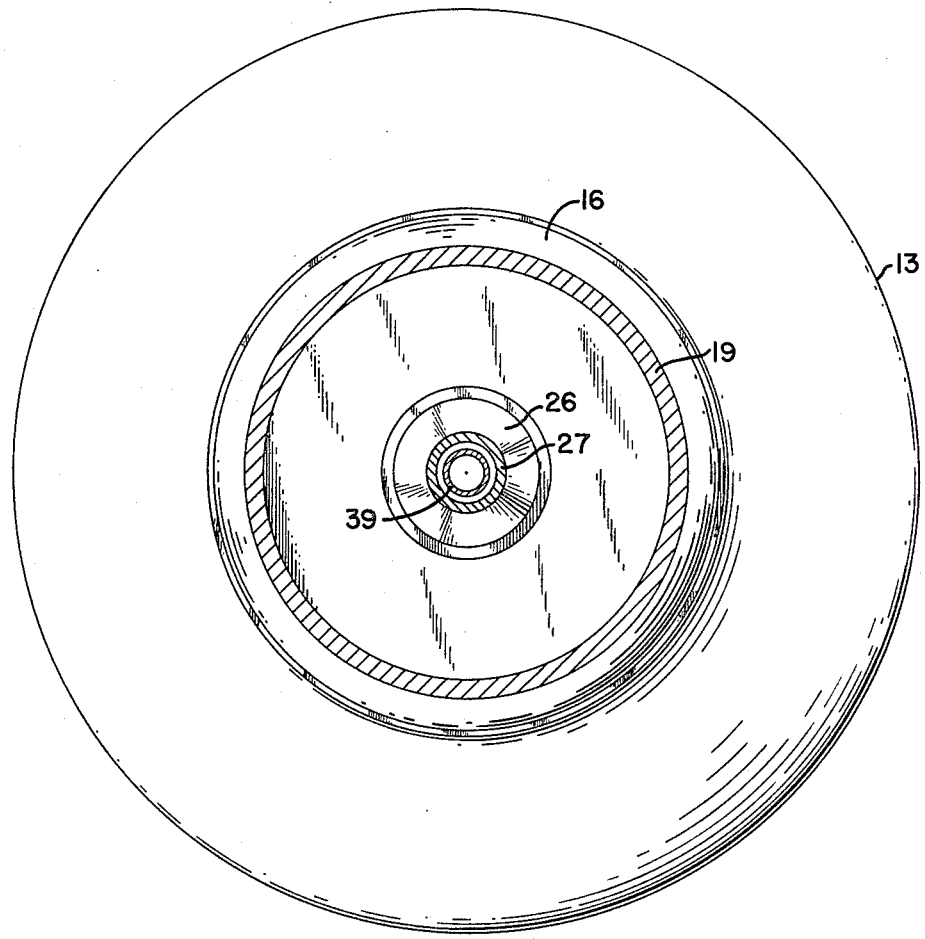
FIGURE 3 is a transverse sectional view on the line 3—3 of FIGURE 2.

Referring more in detail to the drawings, wherein like parts are designated by like reference numerals and more particularly to FIGURES 1 to 3 inclusive, wherein the reference numeral 10 is used to generally designate one form of the injection system embodying the instant invention.

The injection system 10 comprises a suitable cylindrical pressure vessel 11 that is provided at its aft end with external threads 12 whereby it may be connected to a rocket motor case 13 by means of internal threads 14 in the head end opening 15 of the case 13. An annular flange 16 on the exterior of the vessel 11, adjacent the threads 12 thereon, limits and controls the connection of the vessel 11 to the case 13, as shown in FIGURES 1 and 2.

The head end of the vessel 11 is provided with external threads 17 to receive the internal threads 18 of a dome shaped cap 19, which is provided at its central portion with an externally threaded flanged opening 20 which receives the internal threads of a closure 21 having a central opening 22 therein.

Positioned within the vessel 11 in spaced relation to the interior wall surface thereof is a gas generator 23 which comprises a tubular body 24 having a nozzle expansion cone 25 integral with the aft end thereof. The head end of the body 24 is provided with an integral conical portion 26 that extends into a reduced tubular portion 27. The outer end of the portion 27 is provided with external threads 28 that engage with internal threads 29 in the flanged opening 20 of the cap 21, whereby the body 24 of the gas generator 23 is rigidly connected to the cap 19 of the pressure vessel 11. A gasket 29' positioned in an annular groove within the open aft end 30 of the vessel 11 seals the point of contact of the cone 25 with that portion of the vessel 11 defining the open aft end 30 thereof.

The cone 25 is provided with a plurality of radially disposed exhaust or spray ports 31 in each of which is positioned a burst diaphragm 32, for a purpose to be later described. A sonic nozzle throat insert 33 is positioned in the body 24 of the gas generator 23 where it merges into the cone 25 and the insert 33 is of conventional design and fabricated from conventional material.

The body 24 at that portion thereof that merges into the conical portion 26, is provided with a plurality of radially disposed exhaust ports 34 and an annular ring 35, having ports 36 therein that are aligned with the ports 34, is positioned on the body 24 and the ports 36 retain therein in sealing relation with the ports 34, burst diaphragm 37, as shown in FIGURE 1.

A solid propellant 38 is cast into the body 24 of the vessel 11 and a conventional igniter squib 39 to ignite the propellant 38 is inserted into the reduced portion 27 and retained in this position by engagement of the closure 21 with an annular flange 40 on the squib 39. The squib 39 extends outwardly of the closure 21 through the opening 22 therein and electrical connections 41 and 42 are connected to the outer end of the squib 39 for a purpose to be later described.

A piston 43 is slidably mounted on the body 24 of the gas generator 23, within the vessel 11, by means of a central opening 44 therein. That portion of the piston 43, defining the opening 44, is provided with a pair of spaced annual grooves 45 and 46 and gaskets 47 and 48 positioned therein seals the piston 43 at its point of contact with the exterior surface of the body 24. The circumferential edge of the piston 43 is provided with a pair of spaced annual grooves 49 and 50 and gaskets 51 and 52 positioned therein seals the piston 43 at its point of contact with the interior surface of the wall of the vessel 11.

A plug 53 is positioned in the cone 25 to prevent heat convection, radiation and conduction from prematurely initiating the burning of the propellant 38 in the gas generator 23.

Before the ignition system 10 is connected to the motor case 13, as shown in FIGURE 1, a plurality of layers or zones of solid propellant 54 are cast into the motor case 13 and interposed between the layers of solid propellant 54 is a barrier 55 which is to be decomposed and destroyed by carrying out the precepts of the instant invention.

The piston 43 provides the vessel 11 with two chambers, a chamber 56 to receive the combustion gases created by the burning of the solid propellant 38 and a chamber 57 to receive the liquid A which is inhibited red fuming nitric acid.

When the rocket motor, as indicated by the motor case 13, is ready for firing the injection system 10 is in the condition, as shown in FIGURE 1. At a known precalculated period of time or by a signal that is activated when the first layer or zone 54 of solid propellant has been consumed, a command signal is generated by means of wires 41 and 42 to ignite the squib 39. The squib 39 in turn will ignite the solid propellant 38 in the gas generator 23, thus creating combustion gases within the body 24. Such gases will burst the diaphragm 37 permitting such gases to enter the chamber 56. The gases will pressurize the chamber 56, forcing the piston 43 toward the aft end of the vessel 11. The movement of the piston 43 will compress the liquid A in the chamber 56, causing the liquid to burst the diaphragms 37. At the same time the burning of the solid propellant 38 has removed the plug 53 so that when the diaphragms 37 burst, the liquid A is injected through ports 31, as shown in FIGURE 2, and mixing with the hot gases from the gas generator 23 the resulting high temperature reactive environment will decompose the barrier 55 so that the next adjacent layer or zone 54 can be ignited.

The liquid A mixing with the exhaust stream being injected through the cone 25 will produce a highly reactive oxidizing environment in the motor case 13 to completely decompose the barrier 55.

If it desired in the control of the rocket motor, the ignition of the squib 39 may be delayed to carry out the prearranged program for the flight of the rocket motor.

In FIGURES 4 to 7 another form of the injection system is illustrated and such form of the invention is designated by the reference numeral 60.

The injection system 60 comprises a suitable cylindrical pressure vessel 61 that is provided at its aft end with external threads 62 whereby it may be connected, by means of internal threads 63, to an integral annular flange 64 of an adapter 65.

The head end of the vessel 61 is provided with external threads 66 to receive the internal threads 67 of a head end closure 68.

Figure 4:
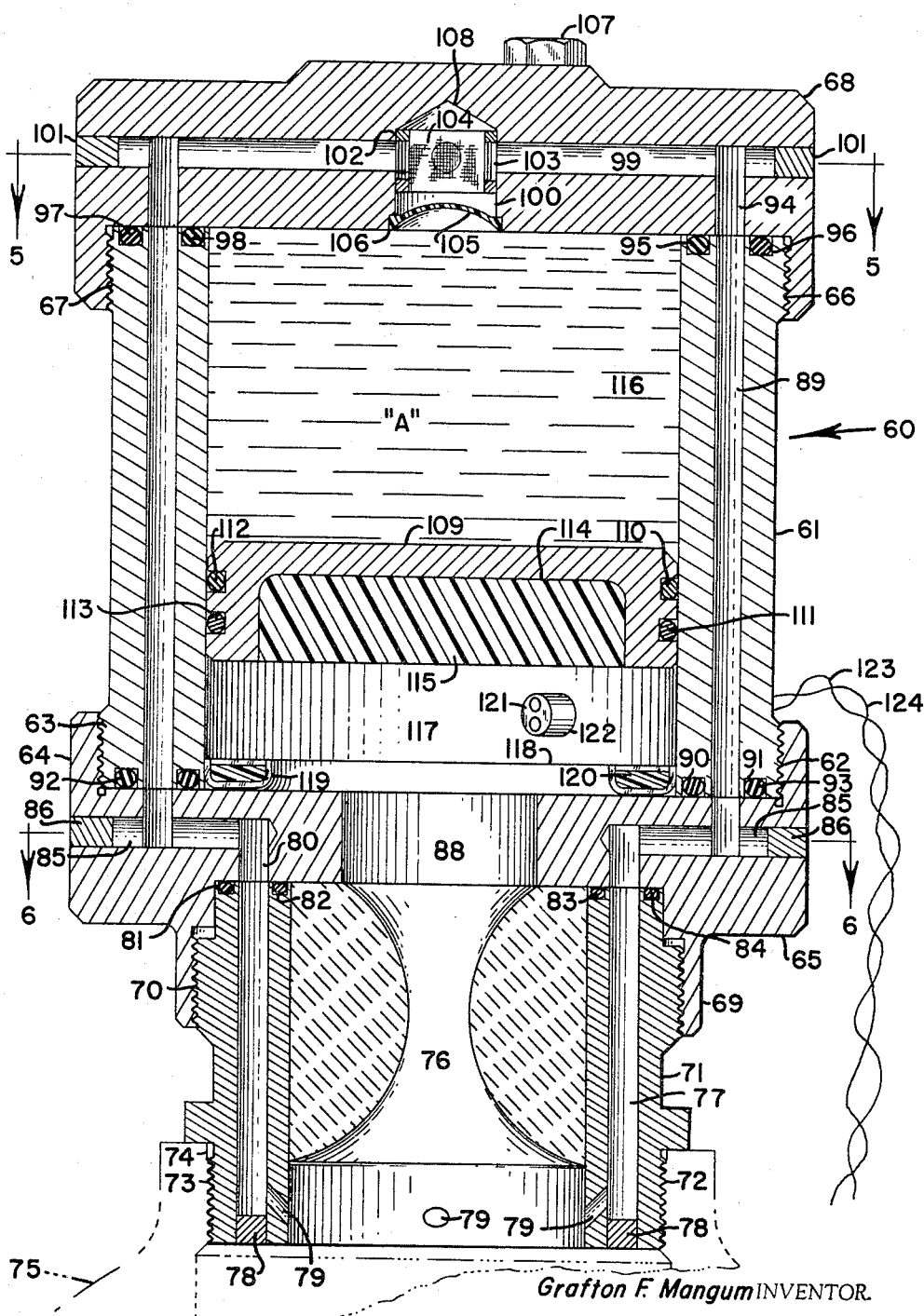
FIGURE 4 is a longitudinal sectional view of another form of the injection system embodying the invention in normal pre-operating condition.
Figure 5:
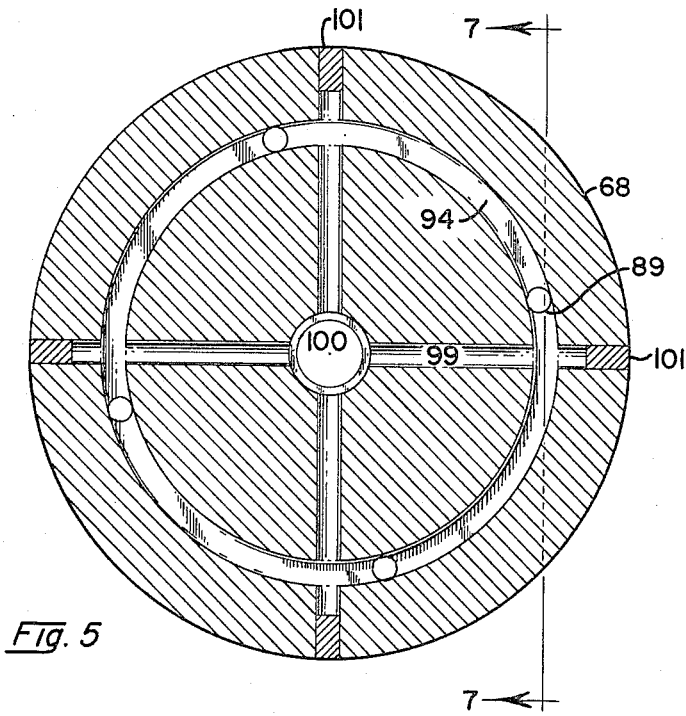
FIGURE 5 is a transverse sectional view on the line 5—5 of FIGURE 4.
Figure 7:
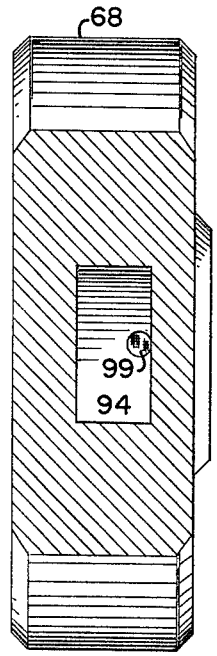
FIGURE 7 is a vertical sectional view on the line 7—7 of FIGURE 5.
Figure 6:
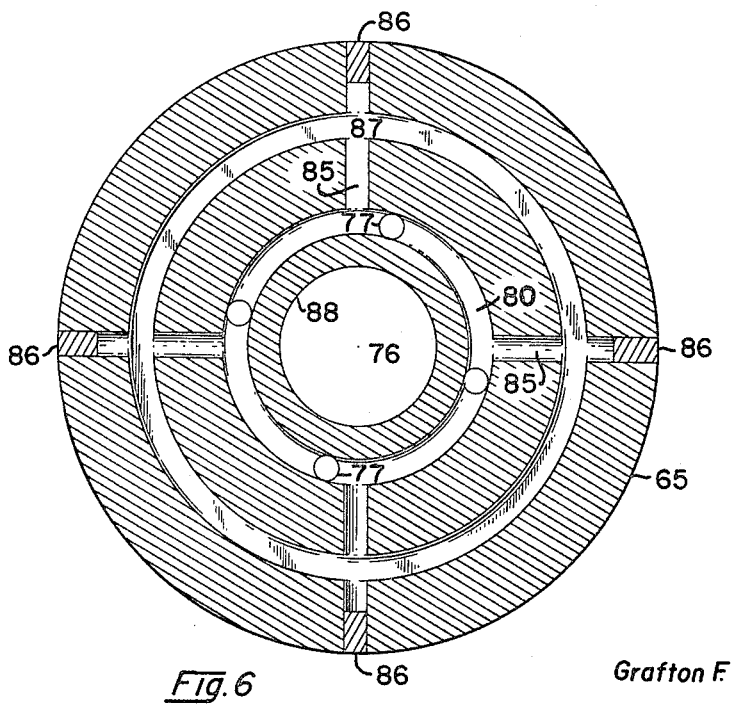
FIGURE 6 is a transverse sectional view on the line 6—6 of FIGURE 4.

The adapter 65 is provided with an internally threaded annular integral flange 69 which receives the external threads 70 of a tubular nozzle expansion coupling 71 that is connected by means of external threads 72 to the internal threads 73 in the head end opening 74 of a rocket motor case 75, as shown by dotted lines in FIGURE 4.

A sonic nozzle throat insert 76 is positioned in the coupling 71 and the insert 76 is of conventional design and fabricated from conventional material. The coupling 71 is also provided with a plurality of radially disposed exhaust ducts 77 which are closed at their aft ends by plugs 78 and spray or exhaust ports 79 in the coupling 71 communicate with the ducts 77 at the aft end of the coupling 71.

The head ends of the ducts 77 communicate with an annular groove 80 in the adapter 65 and annular grooves 81 and 82 in the head end of the coupling 71 in circumjacent relation to the ducts 77 receive gaskets 83 and 84 to seal the passageway between the ducts 77 and annular groove 80.

The adapter 65 is provided with radially disposed exhaust ducts 85 that extend at right angles from the annular groove 80 and are in communication therewith and the outer ends of the ducts 85 are closed by plugs 86.

The adapter 65 is provided with a second annular groove 87 that is concentric with the annular groove 80 and is in communication with the ducts 85 and the adapter 65 is also provided with a centrally disposed exhaust opening 88 that is in direct communication with the throat insert 76 of the coupling 71.

The wall of the vessel 61 is provided with radially disposed longitudinally extending exhaust ducts 89 which communicate at their aft end with the annular groove 87 in the adapter 65.

A pair of spaced annular concentric grooves 90 and 91 are provided in the aft end edge of the vessel 61 on opposite sides of the ducts 89 and gaskets 92 and 93 in these grooves seal the contact surfaces between the vessel 61 and the adapter 65.

The head ends of the ducts 89 communicate with an annular groove 94 in the closure 68 and a pair of spaced annular concentric grooves 95 and 96 are provided in the head end edge of the vessel 61 and are in parallel relation to the grooves 91 and 92 on opposite sides of the ducts 89 and gaskets 97 and 98 in these grooves seal the contacting surfaces between the vessel 61 and the closure 68.

The closure 68 is provided with radially disposed exhaust ducts 99 which communicate with the groove 94 and a centrally located exhaust port 100 in the closure 68. The ducts 99 extend transversely of the closure 68 and the outer ends thereof are closed by plugs 101.

Positioned in the exhaust port 100 is a ring shaped member 102 that is provided with radially disposed exhaust outlets 103 and an annular screen 104 covers the outlets 103 to prevent pieces of a burst diaphragm 105, that is positioned in a groove 106 at the inner edge of the exhaust port 100, from entering the exhaust ducts 99. A filler plug 107 is provided for the vessel 61 and has direct communication with the exhaust port 100 by means of passageway 108.

Mounted for reciprocal movement within the vessel 61 is a substantially floating piston 109. The periphery of the piston is provided with a pair of spaced concentric grooves 110 and 111 and gaskets 112 and 113 in these grooves seal the contacting surfaces of the piston 109 and the inner surface of the wall of the vessel 61. The aft surface of the piston 109 is provided with a centrally located cavity 114 which is filled in any suitable manner with solid propellant 115.

The piston 109 provides the vessel 61 with two chambers, a chamber 116 to receive the liquid A which, as previously indicated, is inhibited red fuming nitric acid and a chamber 117 to receive the combustion gases created by the burning of the solid propellant 115.

The solid propellant 115 is ignited by an igniter 118 which comprises a member 119 which is of circular formation and U-shaped in cross-section, as shown in FIGURE 4. The member 119 is filled with a pyrotechnic material 120 which in turn is ignited by a squib 121 which extends inwardly through an opening 122 in the wall of the vessel 61 into the chamber 117, and electrical connections 123 and 124 are connected to the outer end of the squib 121 for a purpose to be later described.

It is to be understood that the motor case 75 is constructed identically with the motor case 13, as previously described, and when the rocket motor is ready for firing, the injection system is in a condition, as shown in FIGURE 4.

The procedure for operating the injection system 60 is identical with the manner of operation of the injection system 10. The squib 121 is ignited, igniting the pyrotechnic material 120 in the igniter 118 which in turn ignites the solid propellant 115 in the piston 109. The combustion gases, created within the chamber 117, forces the piston 109 toward the head end of the vessel 61. The movement of the piston 109 will compress the liquid A in the chamber 116 causing the liquid A to burst the diaphragm 105. The liquid A will then exhaust through the exhaust outlets 103 of the ring member 102 and the screen 104 will prevent pieces of the diaphragm 105 from interfering with the flow of the liquid A, as now described. The liquid A will then be dispersed through the ducts 99, annular groove 94, ducts 89, annular groove 87, ducts 85, annular groove 80 and ducts 77 to be ejected outwardly of the ports 78 into the motor case 75. The grooves previously described provided direct communication between all the exhaust ducts so that regardless of the torque that is applied to the adapter 65 and closure 68 when they are connected to the vessel 61, there will always be a free and direct passage for the liquid A outwardly of the vessel 61, as previously described.

There is no difference in the operation of the two forms of the injection system, the only difference being structural, as previously described.

It is believed that the operation of the injection systems and their manner of construction will be clear to those skilled in the art and it is to be understood that variations in the manner of operation and construction of the invention may be adhered to provided such alterations fall within the spirit of the invention and the scope of the appended claims.

Having thus described the invention what is claimed as new and desired to be secured by Letters Patent is:

1. A command controllable self-pressurizing liquid injection system for a solid propellant rocket motor, layers of solid propellant in said rocket motor, an inhibitive barrier positioned between and separating said layers of solid propellant, a pressure vessel connected to said rocket motor and having communication with the interior of said rocket motor, a nozzle on said pressure vessel, a floating piston having a cavity therein mounted in said pressure vessel and dividing said pressure vessel into first and second separate chambers, an exhaust port for said first chamber, exhaust ports in said nozzle, passageways in communication with the exhaust port in said first chamber and the exhaust ports in said nozzle, a solid propellant in the cavity in said piston, means for igniting said last said solid propellant so that upon ignition thereof combustion gases created by the burning of said last said solid propellant communicate with said second chamber whereby said combustion gases will force said piston to exert pressure on the liquid in said first chamber and thereby direct said liquid through the exhaust port for said first chamber, said passageways and the exhaust ports in said nozzle to eject the liquid into said rocket motor by means of the combustion gases that are exhausted through the nozzle for said pressure vessel for the decomposition of the inhibitive barrier for controlling the impulse of said rocket motor and wherein a ring-shaped member having a plurality of outlets therein and an annular screen covering said outlets is mounted in the exhaust port of said first chamber.

2. A command controllable self-pressurizing liquid injection system as in claim 1 wherein a burst diaphragm is positioned in the exhaust port for said first chamber to retain the liquid in said first chamber until force is exerted on said liquid by said piston.

References Cited

UNITED STATES PATENTS

| | | | |
|---|---|---|---|
| 2,522,113 | 9/1950 | Goddard | 60—39.47 X |
| 2,671,312 | 3/1954 | Roy | 60—251 X |
| 2,972,225 | 2/1961 | Cumming et al. | 60—259 X |
| 2,984,973 | 5/1961 | Stegelman | 60—251 |
| 3,013,389 | 12/1961 | Barnes | 60—259 X |
| 3,091,923 | 6/1963 | Barnes | 60—259 X |
| 3,182,445 | 5/1965 | Lowes | 60—251 X |
| 3,248,875 | 5/1966 | Wolcott | 60—254 |
| 3,283,510 | 11/1966 | Mangum et al. | 60—251 X |

CARLTON R. CROYLE, *Primary Examiner.*